United States Patent Office 2,940,951
Patented June 14, 1960

2,940,951
METALLO-CERAMIC PREPARATIONS

Simon L. Ruskin, New York, N.Y., assignor to Union Carbide Corporation, New York, N.Y., a corporation of New York No Drawing. Filed Mar. 7, 1955, Ser. No. 492,803

3 Claims. (Cl. 260—37)

My invention relates to a new and novel use of metallic oxides of the rare metals to form metallic substances of great hardness and abrasion resistance. These metallic oxides either singly or in heterogeneous equilibrium with other metals, metal carbides or metal oxides, when sintered by the common methods used in powder metallurgy, yield ceramics of a metallic nature possessed of unique properties of hardness, strength and resistance to abrasion as will be further described.

By my invention it is possible to produce a uniform texture of maximum density containing fine crystallites in random orientation. During firing and various composition conditions no erratic crystal growth occurs thus providing a remarkable uniformity of structure and consistent reproducibility. The uniformity, fineness, random and arrangement of the crystallites produced by my process is responsible to a large part for the texture of maximum density.

To accomplish these results, I develop ceramic and metallic properties in the same material so that while the major part of the material remains as an oxide, part of the original oxide is converted to the metallic state.

Further, by my procedure, fracture due to brittleness and originating from structural defects, particularly those near the surface, is reduced to a minimum degree.

Another advantage of my ceramic metallic composition is the increased resistance to thermal shock. Ceramics generaly fail to resist thermal shock due primarily to an absence of ductility. By my process of ceramic metallic composition a degree of ductility is obtained sufficient to improve resistance to thermal shock.

A still further advantage of my ceramic metallic composition in addition to strength is freedom from creep and chemical resistance at reasonably high temperatures and thus can also be used for intermittent engines where the conventional ceramics would be too sensitive to fracture by thermal shock. My compositions possess an intrinsically low thermal expansion coefficient which makes them highly desirable in spark plugs and jet propulsion equipment.

To produce my invention I irradiate an oxide or salt of the rare metals such as titanium, tantalum, tungsten, vanadium, zirconium, germanium, silicon, thallium, thorium, lanthanum, gallium, uranium, indium, selenium, beryllium, molybdenum, rubidium, caesium, or I may use oxides or salts of other metals and alkaline earth metals such as aluminum, cadmium, barium, calcium, manganese, nickel, chromium, copper, silver, platinum, palladium, or iron. In some instances I may use the carbide of the metal or a combination of the oxide and the carbide of different metals. While I may use generally a single metal oxide, I also may use a combination of metal oxides in heterogeneous equilibrium.

The degree of radiation which I employ is usually from 100 million R to 400 million R. However, in some instances I may employ dosimetry as low as 25 million R. I have found that 100 million R is the more desirable dosage and most generally useful. To achieve tihs radiation I have found the cobalt bomb most efficacious.

The effect of this level of dosage is to randomize the crystals in such a manner that during sintering there is very little or no crystal growth thus producing great density and freedom from pores.

After irradiation, my metallic oxides are partially reduced to the free metal to a varying degree from .2% to as much as 5%. To promote this reduction I may suspend the metallic oxide in water or a medium that is readily oxidizable such as glycerol, sugar or other organic or mineral compound.

In preparing metal oxides or ceramics with metal oxides after irradiation with 100 million to 400 million R the subsequent heating temperatures may be less than the melting point for reaction to occur. Thus while the melting point of titanium dioxide is 1840° C.±10° C. and reaction of titanium carbide and boron carbide to form a heterogeneous equilibrium usually occurs at 1920° C. to form $TiB_2$, it is possible by my procedure after irradiaiton to effect this reaction at much lower temperatures. Similarly, $TiO_2SiO_2$ is easily formed.

By irradiating $Al_2O_3$ in the presence of $SiO_2$ and heating to the melting point, at low pressure, the oxide condenses in the form of crystals above the charge and does so at temperatures below 1800° C. which is ordinarily required. The compound $Na_2B_2O_3SiO_2$ which is important in the glass industry forms readily after irradiation with 100 million R as does the germanium compound $$Na_2CaOGeO_2$$

which shows high transparency to the infra red and opacity toward the ultra violet.

A still further object of the invention is the formation of metallo-ceramic polymers, either long-chain or cross-linked. My long-chain metallo-ceramic polymers are useful for lubricants at high and low temperatures while the cross-linked polymers are converted to the solid state by heat or drying.

To form my metallo-ceramic polymers, I irradiate with 100 million R a mixture of a metallic oxide such as an oxide of the rare metals preferably, although other metal oxides may be employed, with silicic acid and an alcohol having two or more functional hydroxyl groups such as glycerine, ethylene glycol, mannitol and the like or I may use a combination of functional hydroxyl groupings such as chitin, chitose or amine soyan derivatives with glycerine or ethylene glycol, or I may combine my metallo-ceramic composition with other known plastic materials such as the urea formaldehyde, malamine formaldehyde, alkyl resins, vinyl resins, polystyrenes, acryloid plastics, polyethylene or organosilicon polymers, thus combining the unusual properties of the metallo-ceramic polymers with the synthetic plastics and resins already known.

A presumptive graphic formula of my metallo-ceramic polymer is as follows:

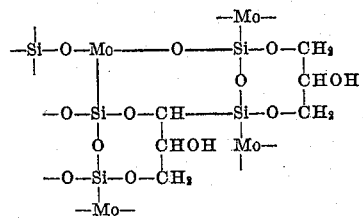

While other linkages may prevail, it is apparent that polymerization does occur. Instead of molybdenum oxide, I may use germanium, tantalum, titanium, indium, tungsten, vanadium, boron, phosphorus, manganese, magnesium, arsenic, antimony, bismuth, caesium, thallium, rubidium, gallium oxides, or iron, copper, cobalt, nickel, chromium, silver, palladium, platinum, aluminum, strontium, calcium oxides, or in general, polyvalent metal oxides. Instead of silicic acid, I may use other acids and acid anhydrides containing two or more functional acid groups such as phthalic acid, malic, succinic acids and the like combined with silicon dioxide and another metallic oxide such as molybdenum oxide. In general, to make my metallo-ceramic polymer, I combine silicic acid with a metal oxide and a carbon compound containing two or more functional hydroxyl groups capable of reacting with the silicic acid and the metal oxide to form a polymer either of the long-chain type or convertible to the solid state by heat drying with or without compression.

Thus I have found that it is possible to use the metallic oxides in powder metallurgy in place of the metal itself. If the metallic oxide is irradiated to 100 million R. to 400 million R. in the presence of an oxygen acceptor which may be an organic compound and in some instances also in the presence of an oxidation reduction catalyst such as platinum oxide, palladium oxide or vanadium oxide. Thus also, a single metal oxide like titanium or a mixture of metal oxides with silicon oxide or silicic acid will yield, after customary powder metallurgy techniques commonly known to metallurgists, a metallo-ceramic composition possessing the unique properties formerly obtainable only with the pure metal. Thus instead of employing expensive titanium metal, I am able to use the commercially cheap, freely available titanium oxide to produce metallo-ceramic tool parts of great value.

*Example I*

300 grams of germanium dioxide were mixed with 300 grams of silicic acid and 300 cc. of glycerol. The whole was irradiated to 100 million R. During the reaction there was evidence of the formation of acrolein, glyceric acid and undetermined etherial components. The germanium dioxide and silicic acid went into solution. This solution was mixed with 5 parts by weight of lamp black and heated to 350° C. at which temperature it polymerized forming a hard, shiny black plastic material. This was pulverized, mixed with binder and compressed into a filament. When exposed to light the filament acted as an electrical conductor. In the absence of light there was barely any conduction at all. Instead of forming a filament, I may employ the solution mixed with silicates to form a glass that is impervious to ultraviolet light but will transmit infra red light.

*Example II*

300 grams of molybdenum sesquioxide is mixed with 300 gms. of silicic acid and 300 cc. of glycerol. The whole was subjected to 100 million R. The solids went into solution forming a dark greenish-brown solution associated with the escape of gas. The solution was mixed with 4% by weight lamp black and heated to 350° C. at which temperature is solidified into a brownish-black mass which was ground up, mixed with plasticizer and heated to 400° C. to form a solid, extremely hard plastic material that could be used as an insulator or semiconductor.

While these examples are illustrative of the preparation of metallo-ceramic composition, I do not limit myself to the percentage of reactants used. The irradiation dosages, however, may range from 50 million to 400 million.

To facilitate the fusing of my metallo-ceramic compounds, I may use metallic copper, from 2 to 10%, or metallic cobalt, from 5 to 15%, or I may employ lamp black or graphite. To faciltate formation of the slug, I may use stearic acid or other fatty acids or I may employ paraffin or similar compositions. Instead of an organic compound as an oxygen donor or acceptor, I may use water, or various acids or alkalis.

What I claimed is:

1. A polymer containing silicon and germanium formed by reacting glycerol, germanium dioxide and silicic acid under irradiation to 100,000,000 R., mixing the solution thus formed with lamp black, and heating to 350° C. until a hard shiny, black, plastic polymer is formed.

2. A polymer containing silicon and an element selected from the group consisting of germanium and molybdenum, said polymer being formed by reacting glycerol, silicic acid and an oxide of said selected element under irradiation to 100,000,000 R., mixing the solution thus formed with lamp black, and heating to 350° C. until a hard, plastic polymer is formed.

3. A polymer containing silicon and molybdenum formed by reacting glycerol, molybdenum sesquioxide and silicic acid under irradiation to 100,000,000 R., mixing the solution thus formed with lamp black, and heating to 350° C. until a hard, plastic polymer is formed.

References Cited in the file of this patent

FOREIGN PATENTS 569,346    Great Britain _____ May 18, 1945

OTHER REFERENCES

Clark et al., Journal Chemical Physics, vol. 5 (1937), pages 97 to 105.